US005941414A

United States Patent [19]

Kasper

[11] Patent Number: 5,941,414

[45] Date of Patent: Aug. 24, 1999

[54] APPARATUS FOR DISPENSING TICKETS, CARDS AND THE LIKE FROM A STACK

[75] Inventor: Kazmier J. Kasper, Hopkinton, Mass.

[73] Assignee: Algonquin Industries, Inc., Bellingham, Mass.

[21] Appl. No.: 08/674,325

[22] Filed: Jul. 1, 1996

[51] Int. Cl.$^{6}$ .......... B23Q 7/04

[52] U.S. Cl. .......... 221/210; 221/259

[58] Field of Search .......... 221/226, 232, 221/248, 230, 259, 277, 210, 213, 217, 197, 258

[56] References Cited

U.S. PATENT DOCUMENTS

| | | | |
|---|---|---|---|
| 2,078,984 | 5/1937 | Williamson | 221/259 |
| 2,637,609 | 5/1953 | Berg | 312/56 |
| 3,790,161 | 2/1974 | Ericsson | 271/117 |
| 3,887,106 | 6/1975 | Charlson et al. | 221/197 |
| 4,039,181 | 8/1977 | Prewer | 271/10 |
| 4,603,792 | 8/1986 | Molineux | 221/96 |
| 4,635,922 | 1/1987 | Roetler et al. | 221/259 |
| 4,704,518 | 11/1987 | Brunn et al. | 235/480 |
| 4,716,799 | 1/1988 | Hartmann | 83/42 |
| 4,982,337 | 1/1991 | Burr et al. | 364/479 |
| 5,018,614 | 5/1991 | Ruckert | 194/236 |
| 5,176,237 | 1/1993 | Yang | 194/211 |
| 5,197,629 | 3/1993 | Sanchez | 221/15 |
| 5,335,822 | 8/1994 | Kasper | 221/259 |

FOREIGN PATENT DOCUMENTS

| | | |
|---|---|---|
| 2588106 | 4/1987 | France . |
| 2176176 | 12/1986 | United Kingdom . |

*Primary Examiner*—Kenneth Noland
*Attorney, Agent, or Firm*—Kriegsman & Kriegsman

[57] ABSTRACT

An apparatus for dispensing articles such as tickets, cards and the like includes a base, a frame mounted on the base for enclosing in a stack a plurality of articles to be dispensed, a gate and a transport mechanism. The transport mechanism includes a rotably mounted drum, a pair of toothed wheels fixedly mounted on the drum, a pair of rotably mounted exit rollers, a motor for driving the drum and one of the exit rollers and an arrangement of gears for coupling the motor to the drum and the drum to one of the exit rollers. In the operation of the apparatus, the toothed wheels transport articles from the stack into the gate and the exit rollers discharge articles from the gate, the gate allowing only one article at a time to pass through.

21 Claims, 4 Drawing Sheets

APPARATUS FOR DISPENSING TICKETS, CARDS AND THE LIKE FROM A STACK

BACKGROUND OF THE INVENTION

The present invention relates generally to an apparatus for dispensing articles and more particularly to an apparatus for dispensing articles such as tickets, cards and the like from a stack. The invention may be used for dispensing pull-tab type lottery tickets; however, it is to be understood that the invention is not exclusively limited to dispensing pull-tab type lottery tickets, but rather may be used with dispensing other types of tickets as well as other types of articles such as cards, including debit cards, telephone cards and the like from a stack.

In U.S. Pat. No. 5,335,822 to K. Z. Kasper, which patent is incorporated herein by reference, there is disclosed an apparatus for dispensing tickets from a stack. The apparatus includes a base. A frame for enclosing a stack of tickets is fixedly mounted on the base. A partition wall whose position can be changed to accommodate tickets of different sizes is removably mounted in the frame. A gate for receiving tickets and allowing only one ticket at a time to pass through is also fixedly mounted on the base. The gate includes a slider element which is adjusted to different heights by a screw having two different sized threads in order to accommodate tickets of different thickness. A toothed blade is disposed underneath the frame and a mechanism which includes a motor driven rack and pinion is coupled to the toothed blade for bringing the toothed blade into engagement with the lowermost ticket in the stack, moving said toothed blade so that the lowermost ticket is transported from the stack into the gate, bringing the toothed blade out of engagement with the ticket and then moving the toothed blade back to engage the next ticket in the stack. A removable weight is seated on top of the stack to push the stack down against the toothed blade. A ticket holder is provided to assist in loading tickets into the frame.

In U.S. Pat. No. 3,790,161 to K. E. Ericsson there is disclosed an apparatus for feeding sheets, cards, banknotes and the like from a stack, the apparatus comprising a rotary roll which engages the lowermost sheet, card or banknote in the stack, a further roll spaced from and preferably slightly above the first roll, and a strip having a rough coating and so arranged between the two rolls as to extend inside a plane tangent to the peripheries of the rolls.

In U.S. Pat. No. 5,018,614 to W. D. K. Ruckert there is disclosed a ticket vending machine wherein an outer housing encloses an inner panel separating a money accepting and ticket dispensing apparatus. The money accepting apparatus releases an internal lever upon insertion of the correct money. This internal lever disengages from a toothed plate which is connected by a shaft to an external hand lever. A pulling of the external hand lever after insertion of the correct money turns multiple gears which cause a cam to actuate to release a ticket retaining gate. In addition, the gears are connected to a cylindrical rear roller which turns a pair of latex bands mounted around the rear roller and a front cylindrical roller mounted on an idler shaft. A weight over the tickets causes frictional pressure to be exerted on the ticket by turning bands and thereby allows the bands to move a single ticket under a raised exit gate.

In U.S. Pat. No. 4,704,518 to F. A. Brunn et al there is disclosed an apparatus for printing and issuing tickets which has a circular ticket guide in which a drive cylinder is disposed to selectively rotate in a forward or reverse direction. A ticket magazine feeds a blank ticket into the ticket guide in the forward direction and the cylinder rotates, driving the ticket in the forward or reverse direction in order to execute a series of process steps involved in issuing the written ticket. The tickets are stacked in the magazine obliquely on edge and retained in a pack configuration at the lower end of the magazine by a gravity actuated ticket retainer. Arrayed in an arcuate sequence adjacent the ticket guide in the forward direction are a printing and reading apparatus, a ramped impound aperture, and a ramped issue aperture. A ticket is fed from the hopper in the forward direction and the drive cylinder is rotated to carry the ticket past the printing and reading apparatus where information is written and verified on the ticket. The drive cylinder continues to rotate in the forward direction, carrying the ticket pass the impound, and then the issue aperture. The drive cylinder then reverses, first offering the ticket through the issue aperture and then, if the ticket is not manually removed from the aperture, the drive cylinder is rotated to feed the ticket into an impound enclosure through the impound aperture.

In U.S. Pat. No. 4,716,799 to D. Hartmann there is disclosed an automatic ticket dispensing machine and a method for operating it to automatically adjust itself to the size of tickets being dispensed. A strip of tickets is fed forward with an advancing mechanism past an optical sensor which detects the perforations between tickets. The optical sensor is coupled to a controller which controls the advancing mechanism. The controller determines the length of the ticket by monitoring the distance the tickets are advanced between detections of perforations. In response to a request for a ticket, the controller advances the ticket strip by a distance corresponding to the predetermined ticket length of output.

In U.S. Pat. No. 4,982,337 to Burr et al there is disclosed a system and method for distributing lottery tickets which includes a large number of remote, ticket-dispensing units which are connected intermittently, e.g., once each day or week to a central computer. The units record the number of tickets sold and transmit the sales data to the central computer, which in turn performs all the necessary accounting functions. Sales reports and invoice data may be sent by the central computer to each unit for printing, which avoids the need to mail the reports/invoices. The tickets are stored in fan-fold form and are burst, rather than cut, apart for dispensing. The tickets are dispensed at one end of the unit which faces the customer. A control panel for the vendor is located at the opposite end. Tickets of different length may be dispensed with an imprint of the vendor's name.

In U.S. Pat. No. 3,887,106 to P. M. Charlson et al there is disclosed a cartridge for merchandise tickets or the like having a slot in its bottom at a ticket entrance end of the cartridge into which the tickets may be fed individually and having a slot in an opposite ticket discharge end and adjacent the bottom through which individual tickets may be fed out of the cartridge. The cartridge may be placed into a hopper having a feed roll movable upwardly so as to frictionally engage the lower most ticket in the cartridge for feeding the ticket out of the cartridge; and the cartridge may be placed into a stacker having feed rolls for moving a ticket through the slot in the bottom of the cartridge, with a feed roll being frictionally engageable with the ticket for moving it completely into the cartridge. A single switch is closed by the cartridge in the stacker so as to condition an associated machine for operation, and this switch is also actuated by a block on the top of a stack of tickets in the cartridge so as to open the switch when the cartridge is full for disabling the machine.

Other patents of interest include U.S. Pat. No. 2,078,984 to S. W. Williamson; U.S. Pat. No. 2,637,609 to P. Berg; and U.S. Pat. No. 5,176,237 to R. G. Yang.

SUMMARY OF THE INVENTION

It is an object of this invention to provide a new and improved apparatus for dispensing tickets, cards and the like.

It is another object of this invention to provide a new and improved apparatus for dispensing tickets, cards and the like from a stack.

It is yet another object of this invention to provide an apparatus as described above which includes a new and novel transport mechanism for dispensing the tickets from the stack.

It is still another object of this invention to provide an apparatus as described above which has a minimum number of parts.

Accordingly, there is provided an apparatus constructed according to this invention for dispensing articles such as tickets, cards and the like comprising a base, a frame for enclosing in a stack a plurality of articles to be dispensed, said frame being mounted on said base, a gate for receiving articles from said stack and allowing only one article at a time to pass through, and a transport mechanism for transporting articles to be dispensed from said stack into said gate and discharging an article from said gate, said transport mechanism comprising a rotably mounted toothed wheel, a pair of exit rollers, and a motor for driving said toothed wheel and said exit rollers.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
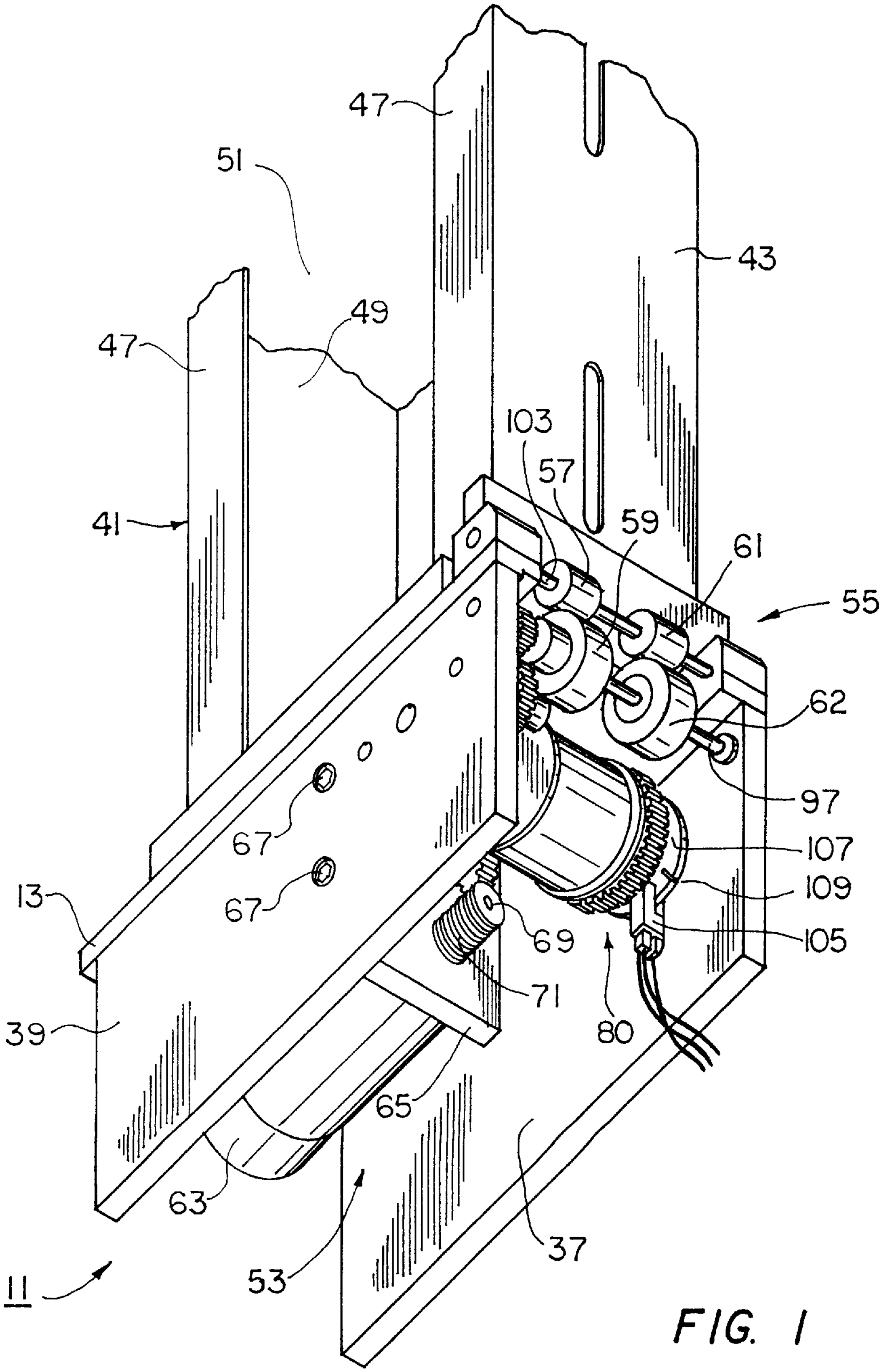
FIG. 1 is a fragmentary perspective view of an apparatus constructed according to this invention for dispensing articles from a stack.
Figure 2:
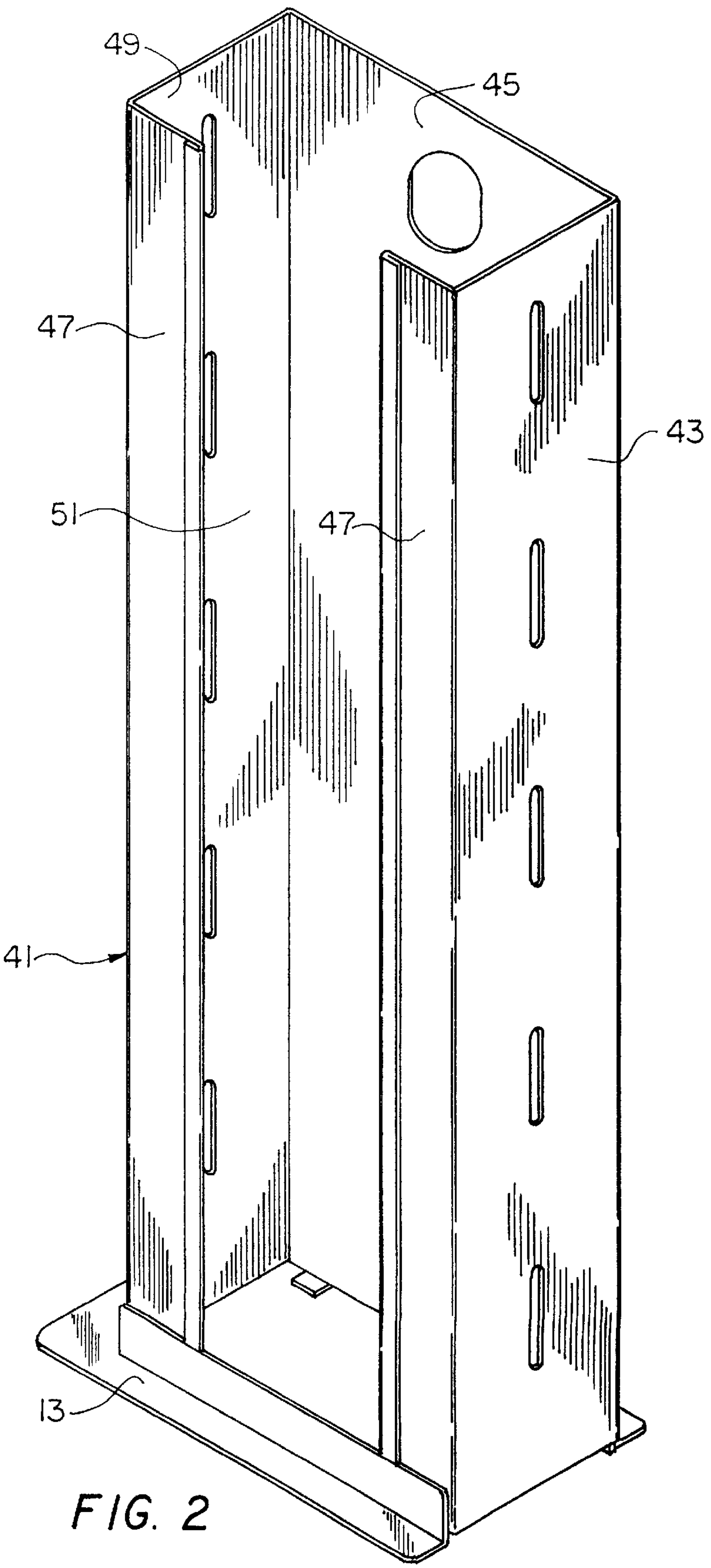
FIG. 2 is a perspective view of the frame and base shown in FIG. 1.

Referring now to the drawings, there is shown in FIG. 1 an apparatus constructed according to this invention for dispensing articles such as tickets, cards and the like, the apparatus being identified by reference numeral 11. Portions of apparatus 11 not pertinent to the invention are not shown.

Figure 5:
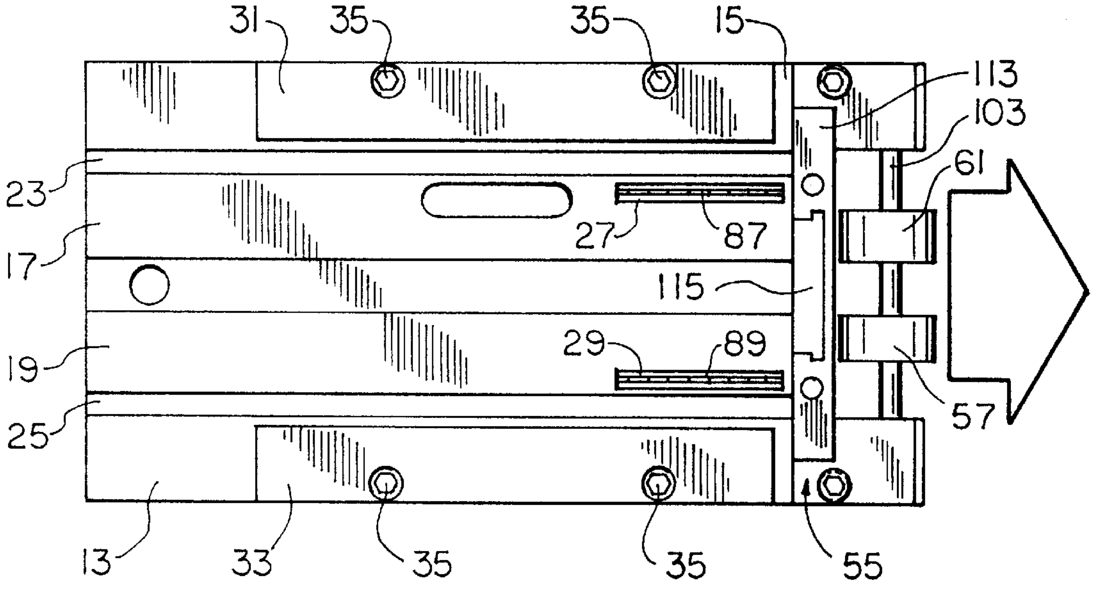
FIG. 5 is a top view of the apparatus shown in FIG. 1, the apparatus being shown without the frame.

Apparatus 11 includes a generally rectangular shaped base 13 made of aluminum or other sturdy material. Base 13, which is also shown in FIG. 5, includes a front end 15, a rear end 17, a top surface 19, a bottom surface 21, a pair of longitudinally disposed recesses 23 and 25 and a pair of elongated rectangular slots 27 and 29. A pair of elongated side members 31 and 33 are fixedly secured to top surface 19 of base 13 by screws 35. Side members 31 and 33 are constructed of a rigid plastic material, such as Delrin.

Apparatus 11 also includes a pair of vertical uprights 37 and 39 made of aluminum or other sturdy material. Uprights 37 and 39 are fixedly secured to bottom surface 21 of base 13 by screws (not shown).

Apparatus 11 further includes an elongated frame 41 for enclosing a plurality of articles A to be dispensed in a stack S, one on top of the other. Articles A may be, for example, pull-tab type lottery tickets, plastic telephone credit cards or the like. Frame 41 is generally rectangularly shaped in cross section and includes a front wall 43, left and right side walls 45 and 47, respectively and a rear wall 49. Elongated frame 41 is removably mounted on top surface 19 of base 13 such that sidewalls 45 and 47 align within longitudinally disposed recesses 23 and 25, respectively. It should be noted that frame 41, instead of being removably mounted on base 13, may be fixedly mounted on base 13 or pivotally mounted on base 13. Right side wall 45 of frame 41 is formed to include an elongated opening 51 to facilitate manually placing and removing articles A within frame 41; however, it should be noted that frame 41 is not limited to this construction. Any combination of walls 43, 45, 47 and 49 may be constructed to include an opening therein. In addition, frame 41 may be designed to include a partition wall which is used to change the area inside frame 41 to snugly hold different sized articles A without having to disassemble frame 41 and replace it with a different sized frame.

Apparatus 11 further includes a transport mechanism 53 and a gate 55. The purpose of gate 55 is to receive articles A transported to it from frame 41 and allow only one article at a time to pass through. Gate 55 is located on top surface 19 at front end 15 of base 13. The purpose of transport mechanism 53 is to transport articles A from stack S into gate 55 and to discharge an article from gate 55.

Figure 3:
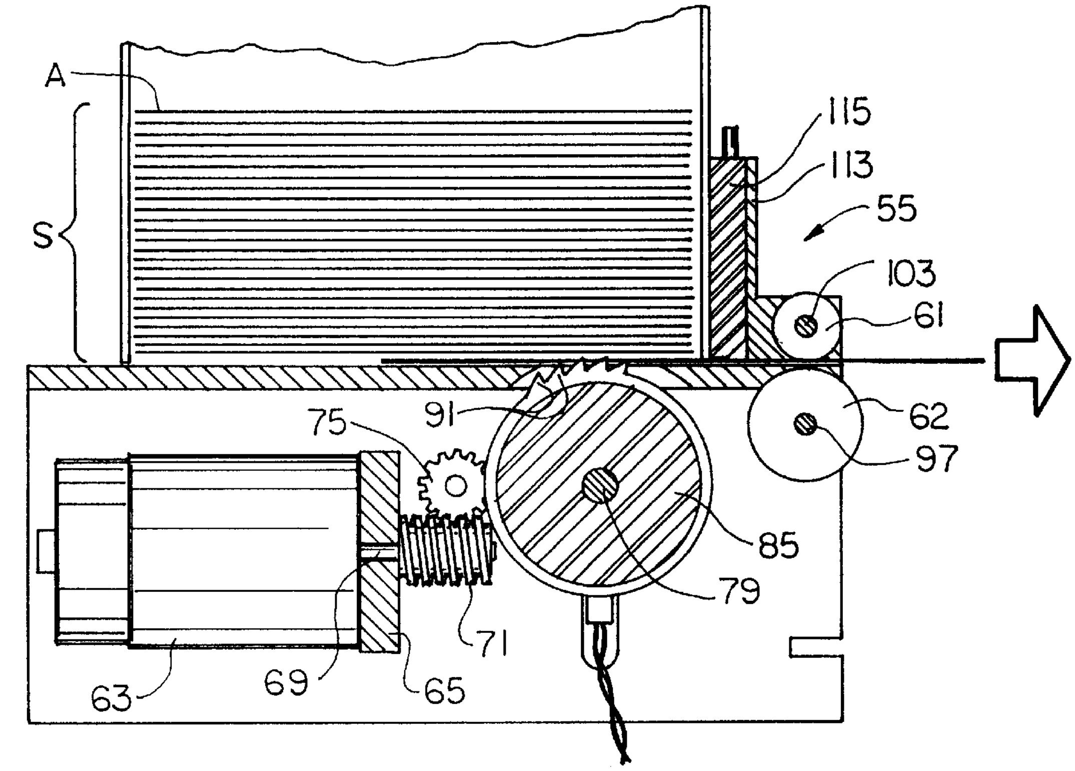
FIG. 3 is a side section view of the apparatus shown in FIG. 1, the apparatus being shown dispensing a ticket from a stack.
Figure 4:
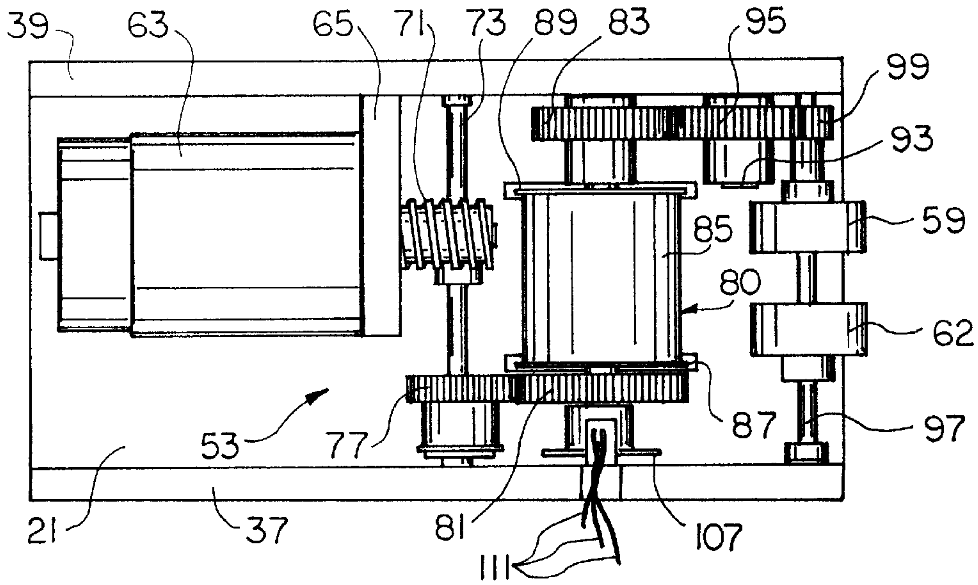
FIG. 4 is a bottom view of the apparatus shown in FIG. 1.

Referring now to FIGS. 3 and 4, transport mechanism 53 comprises a first pair of exit rollers 57 and 59, a second pair of exit rollers 61 and 62 and a motor 63. Exit rollers 57 and 61 are free to idle and serve as pressure rollers. Exit rollers 59 and 62 are driven by a motor 63 as will hereinafter be explained.

Motor 63 is a 12 volt motor. Motor 63 is fixedly mounted onto upright 39 by a bracket 65. Bracket 65 is secured to upright 39 by screws 67. Motor 63 includes a drive shaft 69 which rotates upon activation of motor 63. A spline 71 is mounted on the end of drive shaft 69.

Transport mechanism 53 further includes a first shaft 73, a first gear 75 and a second gear 77. First shaft 73 is rotably mounted on upright 37 and upright 39. First gear 75 and a second gear 77 are each fixedly mounted on first shaft 73. First gear 75 engages with spline 71 such that rotation of spline 71 will rotate first gear 75. Rotation of first gear 75 rotates first shaft 73 which, in turn, rotates second gear 77.

Transport mechanism 53 also includes a second shaft 79, a drum assembly 80, a third gear 81 and a fourth gear 83. Second shaft 79 is rotably mounted on upright 37 and upright 39. Drum assembly 80, third gear 81 and fourth gear 83 are fixedly mounted on second shaft 79. Third gear 81 engages with second gear 77 such that the rotation of second gear 77 will rotate third gear 81. Rotation of third gear 81 rotates second shaft 79 which, in turn, rotates drum assembly 80 and fourth gear 83.

Drum assembly 80 comprises a generally cylindrical drum 85 constructed of a rigid plastic. Drum assembly 80 also includes a first metal disc, or wheel, 87 and a second metal disc, or wheel, 89. Discs 87 and 89 are fixedly mounted on opposite ends of drum 85 and are positioned relative to base 13 such that first disc 87 is aligned within slot 27 and second disc 89 is aligned within slot 29. Discs 87 and 89 each include a plurality of teeth 91 integrally formed on a portion of its periphery. Teeth 91 are sized and shaped to easily grip onto articles A.

Transport mechanism 53 further includes a third shaft 93 and a fifth gear 95. Third shaft 93 is rotatably mounted onto upright 39. Fifth gear 95 is fixedly mounted on third shaft 93. Fifth gear 95 engages with fourth gear 83 such that the rotation of fourth gear 83 will rotate fifth gear 95.

Transport mechanism 53 also includes a fourth shaft 97 and a sixth gear 99. Fourth shaft 97 is rotatably mounted on upright 37 and upright 39. Rollers 59 and 62 fixedly mounted on fourth shaft 97. Sixth gear 99 engages with fifth gear 95 such that the rotation of fifth gear 95 will rotate sixth gear 99. Rotation of sixth gear 99 rotates fourth shaft 97 which, in turn, rotates exit rollers 59 and 62.

Transport mechanism 53 also includes a fifth shaft 103 which is rotatably mounted on gate 55. Exit rollers 57 and 61 are rotatably mounted on a fifth shaft 103.

Constructed in this manner, motor 63 serves to effectively drive both drum assembly 80 as well as exit rollers 59 and 62.

Apparatus 11 also includes a generally U-shaped optical sensor 105 mounted onto upright 37 and a sensor disc 107 rotatably mounted on second shaft 79. Sensor disc 107 is positioned within the legs of optical sensor 105 and includes an elongated slot 109. As such, optical sensor 105 can detect each time slot 109 makes one revolution. In this manner, sensor 105 can be used to send out a signal to a larger control system via wires 111. Therefore, sensor can be used to control the movement of motor 63 and subsequently control the movement of the entire transport mechanism 53.

Gate 55 includes a support 113 and a slider element 115. Slider element 115 is slidably mounted for up and down movement relative to support 113, the space between the bottom of slider 115 and base 13 serving as an opening through which an article A can pass. The height of the opening is controlled by raising or lowering slider 115. Slider 115 is fixed at a desired height by a screw (not shown) which extends through an oval shaped hole (not shown) in support 113 and into a threaded opening (not shown) in slider 115.

In the operation of apparatus 11, articles A to be dispensed are first loaded into frame 41 as a stack S. In conjunction with a larger control system (i.e. an operating computer system), the payment for an article A will activate motor 63. Due to the interrelation of the parts in transport mechanism 53, activation of motor 63 causes both drum assembly 80 and exit rollers 59 and 62 to rotate. As drum assembly 80 rotates, teeth 91 will engage with the lowermost article A in stack S and advance said article towards exit rollers 59 and 62. Teeth 91 disengage with the lowermost article A once said article is in frictional engagement between first pair of exit rollers 57 and 59 and second pair of exit rollers 61 and 62. With motor 63 still activated, first pair of exit rollers 57 and 59 and second pair of exit rollers 61 and 62 further advance article A out from apparatus 11. Motor 63 remains activated until optical sensor 105 detects slot 109, which denotes one complete revolution of drum assembly 80. Upon detection of one complete revolution of drum assembly 80, sensor 105 will send out a signal via wires 111 to the larger control system which will, in turn, deactivate motor 63. The process is repeated for each successive article A in stack S.

It should be noted that more than one apparati 11 could be housed together to form an article dispensing module, each apparatus 11 in the module enclosing a separate stack of articles. The article dispensing module could also be housed within cabinet to form a article dispensing system which includes a control panel for regulating the payment and distribution of tickets or cards. Uprights 37 and 39 enable apparatus 11 to be mountable on a shelf within the cabinet.

The embodiment shown of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An apparatus for dispensing articles such as tickets, cards and the like comprising:

(a). a base, (b). a frame for enclosing in a stack a plurality of articles to be dispensed, said frame being mounted on said base, (c). a gate for receiving articles from said stack and allowing only one article at a time to pass through, and (d). a transport mechanism for transporting articles to be dispensed from said stack into said gate and for discharging an article transported into said gate, said transport mechanism comprising:

i. a first rotatably mounted shaft, ii. a second rotatably mounted shaft, iii. a third rotatably mounted shaft, iv. a fourth rotatably mounted shaft, v. a toothed wheel for moving the lowermost article in said stack into said gate, said toothed wheel being fixedly mounted on said second rotatably mounted shaft, vi. first and second exit rollers for discharging said article from said gate, said first exit roller being fixedly mounted on said fourth rotatably mounted shaft, vii. a motor for rotatably driving said toothed wheel and said first exit roller, and viii. an arrangement of gears coupling said motor to said first rotatably mounted shaft, said second rotatably mounted shaft to said first rotatably mounted shaft, said third rotatably mounted shaft to said second rotatably mounted shaft and said fourth rotatably mounted shaft to said third rotatably mounted shaft.

2. The apparatus as claimed in claim 1 wherein said arrangement of gears comprises a first gear fixedly mounted on said first rotatably mounted shaft, said first gear being in engagement with said motor.

3. The apparatus as claimed in claim 2 wherein said motor includes a spline mounted on a drive shaft, said first gear being in engagement with the spline on said motor.

4. The apparatus as claimed in claim 2 wherein said arrangement of gears comprises a second gear fixedly mounted on said first rotably mounted shaft and a third gear fixedly mounted on said second rotably mounted shaft, said third gear being in engagement with said second gear.

5. The apparatus as claimed in claim 4 wherein said arrangement of gears comprises a fourth gear fixedly mounted on said second rotably mounted shaft and a fifth gear fixedly mounted on said third rotably mounted shaft, said fifth gear being in engagement with said fourth gear.

6. The apparatus as claimed in claim 5 wherein said arrangement of gears comprises a sixth gear fixedly mounted on said fourth rotably mounted shaft, said sixth gear being in engagement with said fifth gear.

7. An apparatus for dispensing articles such as tickets, cards and the like comprising:

(a). a base, (b). a frame for enclosing in a stack a plurality of articles to be dispensed, said frame being mounted on said base, (c). a gate for receiving articles from said stack and allowing only one article at a time to pass through, and (d). a transport mechanism for transporting articles to be dispensed from said stack into said gate and for discharging an article transported into said gate, said transport mechanism comprising:

i. a toothed wheel for moving the lowermost article in said stack into said gate, ii. a first pair of exit rollers for discharging said article from said gate, iii. a motor for driving said toothed wheel and one of said exit rollers, iv. a first rotably mounted shaft, v. a first gear fixedly mounted on said first shaft, and vi. a second gear fixedly mounted on said first shaft.

8. The apparatus as claimed in claim 7, wherein said transport mechanism further includes a drum and a second toothed wheel, each of first and second toothed wheels being fixedly mounted on an end of said drum.

9. The apparatus as claimed in claim 8 wherein the teeth on each toothed wheel are integrally formed on a portion of the periphery of each wheel.

10. The apparatus as claimed in claim 8 wherein said drum is fixedly mounted on a second rotably mounted shaft.

11. The apparatus as claimed in claim 10 wherein said apparatus includes a pair of uprights and said second rotably mounted shaft on which said drum is mounted is on said pair of uprights.

12. The apparatus as claimed in claim 11 wherein said gate includes a support and a slider element.

13. The apparatus as claimed in claim 12 further including a sensor for sending out a signal for controlling rotation of said drum.

14. The apparatus as claimed in claim 13 wherein the pair of exit rollers comprise a pressure roller and a driven roller.

15. The apparatus as claimed in claim 14 further including a second pair of exit rollers, said first and second pairs of exit rollers being positioned relative to one another so as to completely advance the article out from said gate.

16. The apparatus as claimed in claim 15 wherein said motor includes a spline mounted on a drive shaft.

17. The apparatus as claimed in claim 16 wherein said first gear engages the spline on said motor.

18. The apparatus as claimed in claim 17 further including third and fourth gears, said third and fourth gears being fixedly mounted on said second shaft, said third gear engaging with the second gear.

19. The apparatus as claimed in claim 18 further including a rotably mounted third shaft and a fifth gear, said fifth gear being fixedly mounted on said third shaft, said fifth gear engaging with the fourth gear.

20. The apparatus as claimed in claim 19 further including a rotably mounted fourth shaft and a sixth gear, said sixth gear and said first pair of exit rollers being fixedly mounted on the fourth shaft, said sixth gear engaging with said fifth gear.

21. An apparatus for dispensing articles such as tickets, cards and the like comprising:

(a). a base, (b). a frame for enclosing in a stack a plurality of articles to be dispensed, said frame being mounted on said base, (c). a gate for receiving articles from said stack and allowing only one article at a time to pass through, (d). a transport mechanism for transporting articles to be dispensed from said stack into said gate and for discharging an article moved into said gate, said transport mechanism comprising:

i. a toothed wheel for moving the lowermost article in said stack into said gate, ii. a first pair of exit rollers for discharging said article from said gate, and iii. a motor for driving said toothed wheel and one of said exit rollers, and (e). an arrangement of gears for coupling said motor to said toothed wheel and said toothed wheel to one of said exit rollers.

* * * * *